US011520406B2

(12) United States Patent
Colgate et al.

(10) Patent No.: US 11,520,406 B2
(45) Date of Patent: Dec. 6, 2022

(54) BIPOLAR PROJECTED HAPTICS WITH BALANCED LOADING

(71) Applicant: Tanvas, Inc., Chicago, IL (US)

(72) Inventors: James E. Colgate, Evanston, IL (US); Mondher Cherif, Evanston, IL (US); David J. Meyer, Chicago, IL (US); Craig Shultz, Chicago, IL (US)

(73) Assignee: Tanvas, Inc., Chicago, IL (US)

( * ) Notice: Subject to any disclaimer, the term of this patent is extended or adjusted under 35 U.S.C. 154(b) by 0 days.

(21) Appl. No.: 16/884,932

(22) Filed: May 27, 2020

(65) Prior Publication Data

US 2020/0379568 A1 Dec. 3, 2020

Related U.S. Application Data

(60) Provisional application No. 62/853,419, filed on May 28, 2019.

(51) Int. Cl.
*G06F 3/01* (2006.01)
*G06F 3/041* (2006.01)
*G06F 3/044* (2006.01)

(52) U.S. Cl.
CPC .............. *G06F 3/016* (2013.01); *G06F 3/044* (2013.01); *G06F 3/0416* (2013.01)

(58) Field of Classification Search
CPC ........ G06F 3/016; G06F 3/0416; G06F 3/044; G06F 2203/04107; G06F 3/0443; G06F 3/0446

See application file for complete search history.

(56) References Cited

U.S. PATENT DOCUMENTS

| | | | |
|---|---|---|---|
| 9,733,746 B2 | 8/2017 | Colgate et al. | |
| 10,120,447 B2 | 11/2018 | Peshkin et al. | |
| 2011/0285666 A1 | 11/2011 | Poupyrev et al. | |
| 2012/0287068 A1* | 11/2012 | Colgate | G06F 3/045 345/173 |
| 2014/0375580 A1* | 12/2014 | Peshkin | G06F 3/016 345/173 |
| 2015/0277596 A1* | 10/2015 | Hoffman | G06F 3/016 345/179 |
| 2016/0363998 A1 | 12/2016 | Colgate et al. | |

(Continued)

FOREIGN PATENT DOCUMENTS

KR 10-1460772 B1 11/2014
KR 10-2015-0045676 A 4/2015

*Primary Examiner* — David D Davis
(74) *Attorney, Agent, or Firm* — Vedder Price P.C.

(57) ABSTRACT

An indirect haptic device includes a substrate having a top surface and a bottom surface, and a plurality of haptic electrodes and a plurality of island electrodes arranged on the top surface. The device further includes a plurality of transmit electrodes and a plurality of receive electrodes arranged on the bottom surface, a position sensor, and a friction modulator. The device further includes a control device configured to apply bipolar electrical signals to the plurality of transmit electrodes to detect touch locations of a user's appendage and to modulate the friction between the user's appendage and the touch surface. Each of the plurality of haptic electrodes are substantially aligned with and capacitively coupled to a corresponding two of the plurality of transmit electrodes.

12 Claims, 9 Drawing Sheets (56) References Cited

U.S. PATENT DOCUMENTS

| | | |
|---|---|---|
| 2017/0344119 A1 | 11/2017 | Cherif et al. |
| 2018/0059849 A1* | 3/2018 | Peshkin ................ G06F 3/045 |
| 2018/0067560 A1 | 3/2018 | Lacroix et al. |
| 2019/0265793 A1* | 8/2019 | Costante ................ G06F 3/016 |

* cited by examiner

BIPOLAR PROJECTED HAPTICS WITH BALANCED LOADING

CROSS-REFERENCE TO RELATED APPLICATIONS

This application claims the benefit and priority of U.S. Provisional Patent Application Ser. No. 62/853,419, filed May 28, 2019, the disclosure of which is hereby incorporated herein by reference in its entirety.

FIELD OF THE INVENTION

The invention relates to haptic devices and, more particularly, to haptic devices that provide indirect haptic feedback and texture sensations to a user by modulation of friction of a touch surface of the device.

BACKGROUND OF THE INVENTION

Known in the art is the technique of electroadhesion for modulating the friction between a human fingertip and the touch surface in order to produce an indirect haptic effect experienced as the finger slides across the surface. Variations in friction produced by varying the strength of the electroadhesion effect cause tactile effects which may be experienced as vibrations, textures, edges, surface waviness, and events such as striking a ball. Electroadhesion is an attractive technique for delivering rich haptic sensations because it involves no mechanical motion (i.e., it is solid state), it uses power efficiently, it has high bandwidth, and it may be localized on different regions of a surface. Often, it is desirable to employ electroadhesion on a transparent touch surface such as a touch screen. In these applications, it is also desirable to have a means of measuring the location of each finger that is touching the surface. In other words, it is desirable that the surface should serve as a touch screen, trackpad, or other touch input device, while also providing haptic feedback to each fingertip that is touching the surface.

Electroadhesion depends on the formation of an electric field that acts across the air gap that exists between the fingertip and the surface it is touching. An air gap exists due to the roughness of the skin (and possibly that of the surface): true contact occurs at only a small number of points while air remains between the two surfaces over most of the apparent contact area. In practice, other fluids such as water or sebum, may also be present. The presence of other fluids does not prevent electroadhesion from occurring. Therefore, we use the term "air gap" with the understanding that other fluids may partially fill the gap. The electric field in the air gap exerts an attractive force between bound or polarized charge contained in the skin and the surface. This increase in attractive force causes an increase in friction, otherwise called friction modulation. For a given system configuration, the strength of the friction modulation effect principally depends on the strength of the electric field in the air gap. In a practical device, it is desirable to use as low a voltage as possible to create the electric field.

As a rough guide, experience has shown that the air gap between the finger and a lightly textured surface such as anti-glare glass, is about 2 microns on average. In a gap this size, the maximum electric field that can be sustained without breakdown may preferably be about 1e8 V/m, although that number may vary based on a variety of factors, including the size of the air gap. At this field strength the maximum useful voltage may preferably be 2e-6m×1e8 V/m=200 V, although that number may also vary based on a variety of factors, including the size of the air gap. In practice, somewhat lower voltages may provide a margin of safety and reliability. For purposes of exposition, here it is assumed that it is desirable to generate 100 V across the air gap although lower or higher voltages may be used.

100 V is a convenient value because there are a number of silicon processes that may be used to build integrated circuits for switching voltages that are no more than a few hundred volts. There are other factors, however, that complicate the design and that tend to require higher voltages.

The first complicating factor is the desire for a top insulating layer, which is often a requirement to ensure the longevity of touch screens. If the touch surface is conducting, the air gap will tend to be shorted out by points of contact, especially in the presence of water. Additionally, if the system needs to be transparent, it is difficult to place a transparent conductor on the top surface without exposing it to undue abrasion and wear. For these reasons, electroadhesion systems typically coat the conductors with a durable insulating layer. This layer, however, is in electrical series with the air gap. As such, some portion of the applied voltage may drop across the insulating layer, thus reducing the available voltage to be applied to the air gap.

Depending on frequency as well as material properties, electrical field strength, and thickness, the electrical impedance of the insulating layer may be dominated by a complex reactance, resistance, or a combination of both. This complex impedance behavior, however, may be represented by less complex linear capacitance and resistance models. For the purposes of explanation, the insulating layer is described herein solely as a series linear capacitance, but this invention is not limited to that case. If $C\_i$ is the lumped capacitance of the insulating layer and $C\_gap$ is that of the air gap, then the applied voltage that may be necessary to produce a 100V voltage drop across the air gap is:

$$V\_applied=[(C\_i+C\_gap)/C\_i]*100 \text{ volts}$$

If, for instance, $C\_i=C\_gap$, then V_applied would be 200V. In general, a larger value of $C\_i$ allows for lower operating voltage. This is consistent with thinner insulators having high dielectric constants. If, for instance, the insulating layer is 6 microns thick and has a dielectric constant of 3, then the insulating layer will have the same capacitance as a 2 micron air gap (which, it is assumed, has a dielectric constant of 1).

It is evident from the above that the insulating layer may be quite thin in a practical design (although, if the resistance of the layer is sufficiently low or the dielectric constant is sufficiently high, it may be thicker). If the insulating layer is thin, then a second practical issue is that scratches may occur such as due to a grain of sand being dragged across the surface in a manner that may compromise the underlying electrodes. A partial solution to this problem is to ensure that the insulating layer is extremely scratch-resistant; however, it may not be possible to rely on this solution alone. Another solution, that has been described in previous inventions (U.S. Pat. No. 10,120,447 and U.S. patent application Ser. Nos. 15/178,283 and 15/606,440, which are hereby incorporated by reference in their entireties), is to activate the conducting layer (which may be patterned into a set of electrodes) via capacitive coupling to another set of electrodes located in a deeper, more protected layer. In a typical embodiment, such as shown in FIG. 6 of U.S. Pat. No. 10,210,447, both sets of electrodes are patterned on the same sheet of glass: the "haptic electrodes" are on the touch surface and covered by the aforementioned thin insulating layer; the "transmit electrodes" are on the bottom surface and protected by the full thickness of the glass sheet. Previously, this arrangement has been described as "mirrored" electrodes since the shapes of the haptic electrodes and the transmit electrodes may be approximately the same, and the electrodes may be approximately in alignment, so that capacitive coupling through the glass sheet is maximized. An advantage of this arrangement is that, even if a haptic electrode is compromised by a scratch, it may still be activated by coupling to a transmit electrode.

The capacitance from transmit electrode to haptic electrode is also in electrical series with the air gap capacitance, causing additional voltage drop. Before estimating this voltage drop, however, one additional issue must be addressed: bipolar operation.

U.S. Pat. No. 9,733,746 describes an architecture in which the haptic electrodes are arranged in a pattern such that a finger placed on the touch surface will cover more than one electrode. If these electrodes are driven to opposite polarities relative to the body's ground, then the voltage drop across the air gap is relatively independent of the strength of the body's coupling to ground. In other words, a body that is well-grounded and a body that is poorly grounded should feel the same strength haptics. This was a significant advance over the prior art which required the body to be well-grounded in order to deliver full-strength haptics.

The ideas presented above are available in the prior art and may be used to create a practical electroadhesion device. What is needed, however, is a means of combining this with multi-touch sensing, which is the ability to measure and track the location of a multiplicity of fingertips that are interacting with the touch surface. A practical multitouch sensor should also be able to identify things, such as water droplets and palms, that are not fingertips. Prior art has suggested various approaches, none of which has proven as robust as state-of-the-art touch sensors, most of which are based on mutual capacitance measurements.

The present invention is an integrated system for providing highly robust multi-touch sensing and, simultaneously, highly robust electroadhesion-based haptics. Similar to touch sensors based on mutual capacitance, the present invention is based upon a set of transmit electrodes (Tx), a set of receive electrodes (Rx) and measurements corresponding to each Tx-Rx intersection, yielding a two-dimensional image from which touch locations can be extracted. The details, however, are quite different owing to the need to integrate this sensor system with electroadhesion-based haptics.

SUMMARY OF THE INVENTION

In an illustrative embodiment of the invention, an indirect haptic device is provided comprising a substrate having a touch surface comprising a top surface and a bottom surface, and a first set of electrodes arranged on the top surface of the substrate and a second set of electrodes arranged on the bottom surface of the substrate. The device further comprises a position sensor configured to sense or detect one or more touch locations of a user's appendage on the touch surface and a friction modulator associated with the substrate and configured to modulate the friction between the user's appendage and the touch surface. In addition, a control device is connected to the position sensor and the friction modulator, and the control device is configured to apply bipolar electrical signals to the second set of electrodes to both detect one or more touch locations of a user's appendage on the touch surface and to modulate the friction between the user's appendage and the touch surface.

In an illustrative embodiment of the invention, a method is provided comprising providing a substrate having a touch surface comprising a top surface and a bottom surface, wherein a first set of electrodes are arranged on the top surface of the substrate and a second set of electrodes are arranged on the bottom surface of the substrate. The method further comprises detecting one or more touch locations of a user's appendage on the touch surface via application of bipolar electrical signals to the second set of electrodes and modulating the friction between the user's appendage on the touch surface via application of bipolar electrical signals to the second set of electrodes.

The above features and advantages of the present invention will become apparent from the following detailed description taken with the following drawings.

DETAILED DESCRIPTION OF THE INVENTION

Figure 1A:
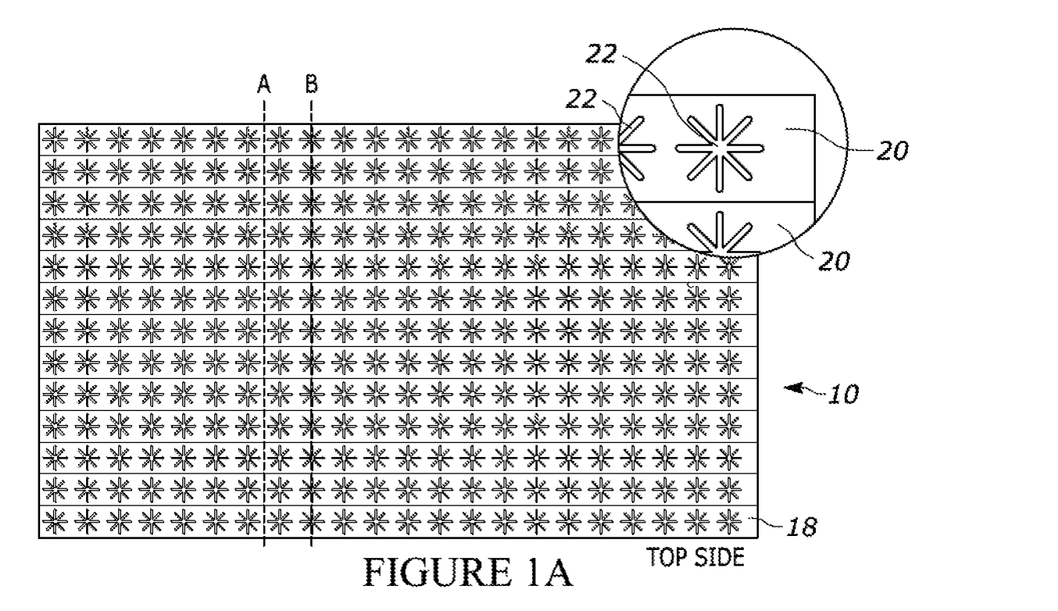
FIG. 1A is a top view of a touch panel having haptic and sensing electrodes.
Figure 1B:
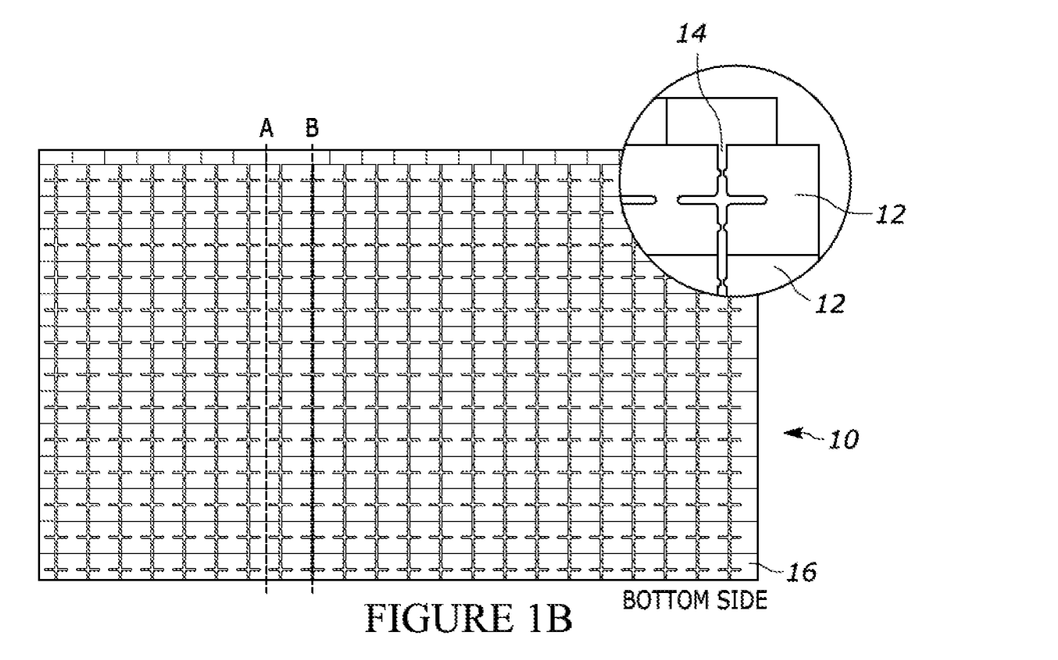
FIG. 1B is a bottom view of a touch panel having haptic and sensing electrodes.
Figure 1C:
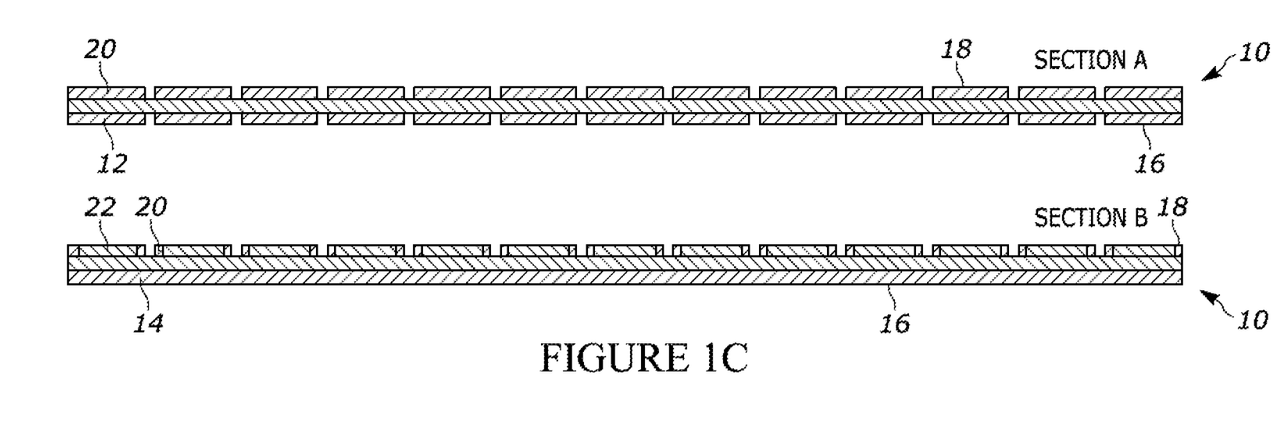
FIG. 1C is a side view of a touch panel having haptic and sensing electrodes.

FIGS. 1A, 1B, and 1C illustrate the construction of a first embodiment. In this embodiment, four types of electrodes are provided for and are disposed on a sheet of glass 10. Transmit (Tx) electrodes 12 and Receive (Rx) electrodes 14 are located on the bottom side 16 of the glass 10, away from the touch surface 18. Haptic (Hx) electrodes 20 and Island (Is) electrodes 22 are located on the top side (touch side) 18 of the glass 10. Note that other constructions are possible. For instance, each of the types of electrodes may be placed on a different layer, layers may be disposed on different substrates, and those substrates may be assembled (e.g., laminated) in a further processing step. The substrates do not need to be glass, but may be other insulating or semiconducting materials, such as plastics, ceramics, or natural materials. Alternate constructions are discussed later in this document.

In this embodiment, the Tx and Hx lines 12, 14 may extend laterally across one dimension of the glass substrate, are aligned, and have substantially similar shapes. The electrodes do not need to extend laterally across the substrate, but may take on different forms such as localized patches or zig-zags. In this embodiment, the Tx lines 12 take up most of the area of the bottom side 16 while the Hx lines 14 take up most of the area of the top side 18 in order to maximize their capacitive coupling. In a preferred embodiment, the glass substrate 10 may have a thickness no greater than 0.7 mm, preferably 0.4 mm or less, and it has a dielectric constant of at least 3 but preferably higher, such as 6 or more.

Figure 2:
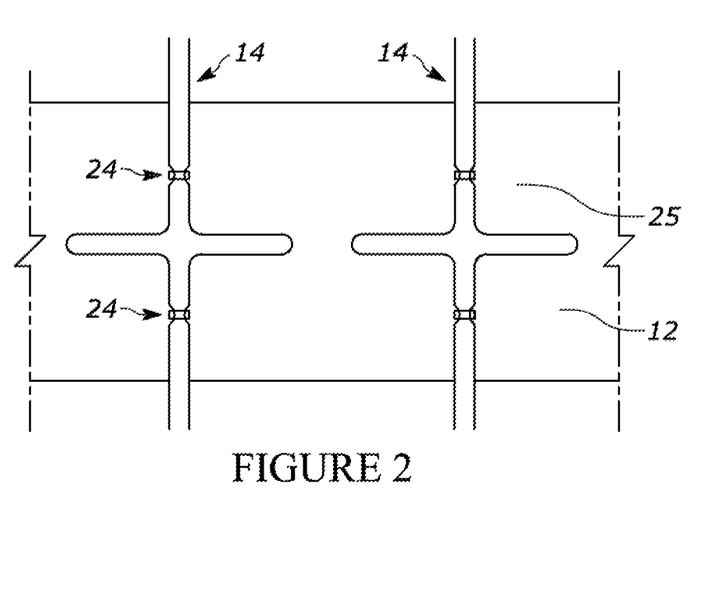
FIG. 2 is a detailed view of touch panel electrodes.

In this embodiment, the Rx lines 14 may run perpendicular to the Tx lines 12 and may be formed from substantially the same conductive layer, which may be indium tin oxide (ITO) having a resistivity of 45 ohms per square (ops). Other conductors and other resistivities may be used. Where Tx and Rx lines 12, 14 cross, conductive bridges 24 may be formed to ensure connectivity. The bridge 24 may be formed using techniques known in the art, such as placing a patch of polymer over the continuous electrode and then a strip of metal over the polymer, connecting the two sides of the discontinuous electrode. In a preferred embodiment, the Rx electrodes 14 are continuous and two bridges 24 are formed (as shown in FIG. 2) for each Tx-Rx intersection 26. The use of more than one bridge reduces resistance and increases reliability. Additionally, at each Tx-Rx intersection 26, both the Tx and Rx lines 12, 14 should have sufficient area to make meaningful capacitive coupling to an Island (Is electrode) 22 that is disposed on the other side of the glass 10, aligned with the intersection 26. In a preferred embodiment, the Is electrodes 22 have "asterisk" shapes consisting of eight (8) spokes emanating from a central hub, although a variety of other shapes may be used. The underlying Rx electrode 14 may be aligned with four (4) of the spokes while the underlying Tx electrode 12 overlaps the remaining four (4) spokes. This arrangement ensures capacitive coupling from both the Tx and the Rx line 12, 14 to the corresponding Is electrode 22, the benefits of which will be discussed in the sequel.

In a preferred embodiment, the Is electrodes 22 are each disposed within the confines of an Hx electrode 20. There are no bridges necessary on the top side 18 in this embodiment because all Hx and Is electrodes 20, 22 are formed from the same conductive sheet, which may be ITO with a resistivity of 150 ops, although lower or higher values may also be used. Patterning of electrodes may be accomplished by techniques known in the art, such as photolithography, screen printing, or laser ablation.

In a preferred embodiment, the distance between neighboring Hx electrodes 20 (also known in the art as the deletion line width) is greater than the distance between neighboring Tx electrodes 12. For example, the distance between neighboring Hx electrodes 20 may be 200 microns while the distance between neighboring Tx electrodes 12 may be 60 microns. Other distances may be used as well, including embodiments where the distance between neighboring Hx electrodes 20 is less than or equal to the distance between neighboring Tx electrodes 12. Also, rather than eliminating all ITO between neighboring electrodes, some amount of ITO, typically in the form of small patches, may remain to minimize the visibility of the deletion lines.

Figure 3:
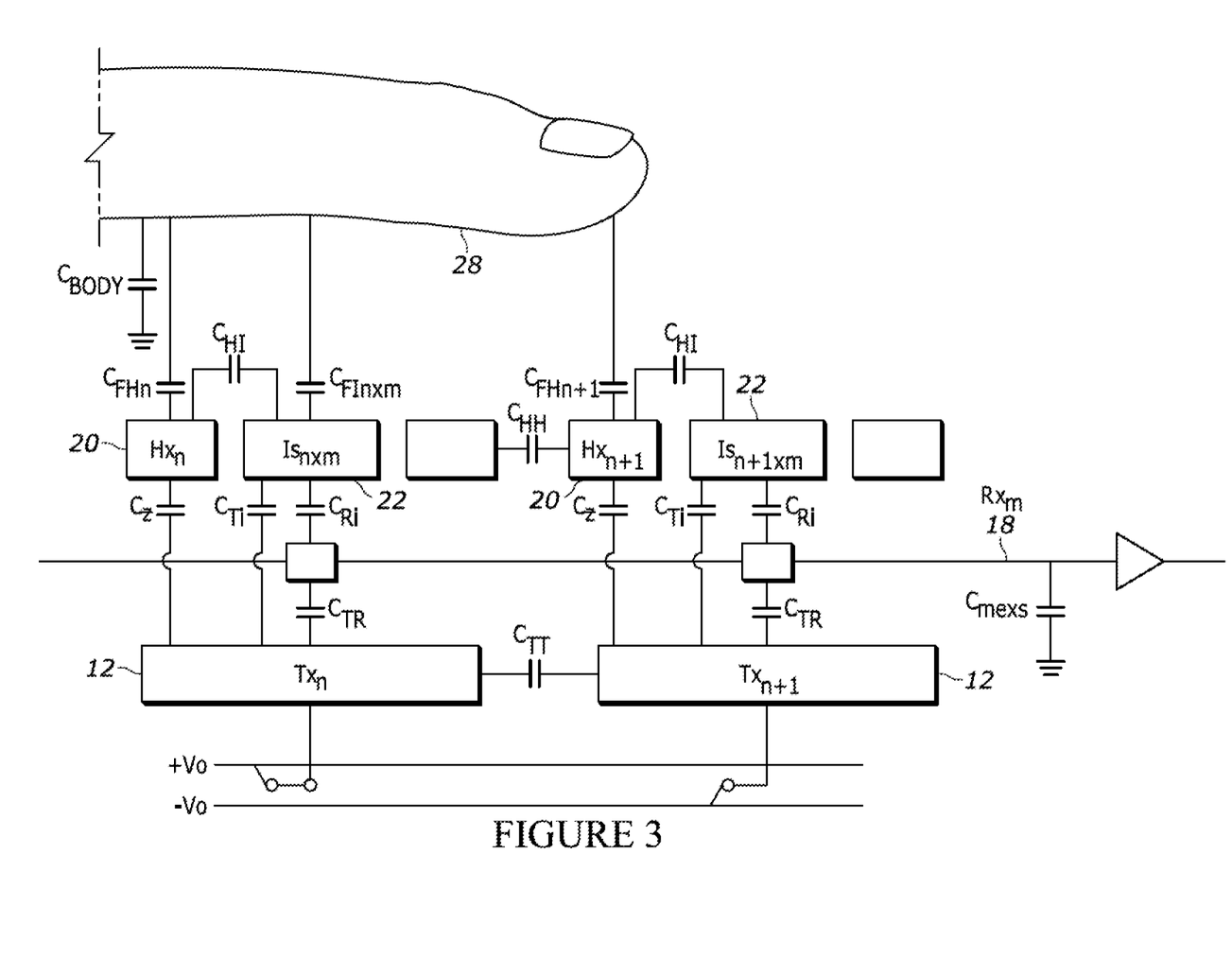
FIG. 3 is a partial illustration of the electrical potentials and capacitances in a region near to the location of a finger.

FIG. 3 is a partial illustration of the electrical potentials and capacitances in a region of the preferred embodiment near to the location of a finger 28. It is important to note that FIG. 3 is for exposition only and it is not accurate with respect to scale and does not show all of the capacitive couplings at play in a real system. FIG. 3 is used here to elucidate the key concepts of the present disclosure as they relate to haptics and to sensing. FIG. 3 shows two Tx electrodes 12 (numbered n and n+1), both of which extend into the plane of the paper. Also shown is a single Rx electrode 14 (number m) which extends left to right across the paper. In practice, the Tx and Rx electrodes 12, 14 may be on the same plane, or a different plane (e.g. the Rx electrodes 14 are on a plane that is beneath or above the Tx electrodes 12). Also illustrated are two Hx electrodes 20 (numbered n and n+1) that are aligned with and substantially the same shape as the Tx electrodes 12. However, situated within each Hx electrode 20 are a number of Island (Is) electrodes 22, two of which are shown (numbered n×m and n+1×m). It should be noted that both the Hx and Is electrodes 20, 22 are electrically and conductively isolated, or separated, from Tx and Rx electrodes 12, 14, as well as other Hx and Is electrodes 20, 22, the body, and the rest of the electrical subsystem. This means that the Hx and Is electrodes 20, 22 make no ohmic or direct connection to other conductive elements, but are instead left electrically floating. To assume any given electrical potential, therefore, the Hx and Is electrodes 20, 22 can only interact with nearby elements (Tx/Rx electrodes 12, 14, other Hx/Is electrodes 20, 22, a finger 28, etc.) via local capacitive coupling. FIG. 3 also shows a finger 28 in a location where it interacts with both Hx electrodes 20, but much more strongly with one Is electrode 22 than the other. Also shown in FIG. 3 are two high voltage rails and switches connecting one Tx electrode 12 to a positive voltage and the other Tx electrode 14 to a negative voltage. A number of relevant capacitances are shown, and will be referenced in the discussion of haptics and sensing.

Note that in this illustrated preferred embodiment both the body potential and device potentials (including potentials of various Tx, Rx, Hx, and Is electrodes) are referenced to the same local earth ground. This configuration, however, is solely for illustrative purposes, and is not a necessary condition for this invention. In other embodiments, the device may be galvanically isolated from local earth ground, for instance by using known techniques such as an isolation transformer or local battery power supply, and thus all device potentials may be referenced to the potential of the body, or some other point. Additionally, the body potential may or may not be held at local ground potential via additional galvanic (direct) connections, or strong capacitive coupling connections. In fact, one advantage to the sensing and electroadhesive driving technique disclosed herein is that it is robust to the various grounding conditions of both the body and the device.

To achieve a strong electroadhesion effect, the difference between the Hx electrode 20 potential and the human body potential is preferably as high as possible, thus creating the greatest possible electric field across the air gap. Variations in friction produced by varying the strength of the electroadhesion effect generates the friction modulator for the device—a friction modulator associated with the substrate and configured to modulate the friction between the user's appendage and the touch surface. In this illustrative case, the human body potential is assumed to be close to local earth ground, meaning C_body is discharged, while each Hx electrode 20 is as close to that of its associated Tx electrode 12 as possible. In the configuration shown, Tx_n is set to +Vo volts relative to local earth ground, while Tx_n+1 is set to −Vo volts. In the absence of a finger 28, it may be shown that the haptic electrodes achieve the following potential:

$$Hx\_n=[C\_z/(C\_z+2*C\_HH)]*Vo$$

$$Hx\_n+1=-Hx\_n$$

To maximize haptic electrode potential, it may be desirable to maximize C_z, which is the capacitance between each Hx electrode 20 and its mirrored Tx electrode 12, and to minimize C_HH, which is the mutual capacitance between neighboring Hx electrodes 20. The former suggests using wider and longer Hx (and Tx) electrodes, and using a thinner glass substrate with a larger dielectric constant. The latter suggests wider deletion lines between neighboring Hx electrodes 20. Additionally, if the deletion line widths between neighboring Tx electrodes 12 are narrower (i.e., the Tx electrodes 12 are wider than the Hx electrodes 20), the Tx electrodes 12 will have a shielding effect, reducing C_HH even further. This is a simplified analysis and there are other factors that may come into play. For instance, other voltages may be applied to other Tx electrodes 12, which may in turn affect the voltage of the Hx electrodes 20.

If a finger 28 is located above both Hx electrodes 20, it may act as additional mutual capacitance (i.e., added C_HH) and may reduce the Hx voltage further. If half of the finger is over each polarity of Hx electrode 20, it may be shown that the haptic electrodes achieve the following potential:

$$Hx\_n=[C\_z/(C\_z+2*C\_HH+0.5*C\_HF)]*Vo$$

$$Hx\_n+1=-Hx\_n$$

To maximize haptic electrode potential, it may be desirable to minimize C_HF, which is the capacitance between the full set of Hx electrodes 20 and the finger. However, it should be appreciated that the electroadhesive effect also depends on the magnitude of C_HF. As such, there may be an optimal value of C_HF for a given touch panel design. C_HF may be adjusted by changing the thickness, composition, or roughness of the insulating layer that covers the Hx and Is electrodes. Alternatively, it may be adjusted by changing the Hx and Is electrodes 20, 22 themselves. For instance, instead of forming these electrodes from a continuous sheet of conductor, they may be formed from a grid of conductors or from a sheet with many small perforations. The areal density of conductor may even be adjusted according to location on the Hx or Is electrode in order to ensure the most uniform electric field strength possible. As yet another alternative, the Hx and Is electrodes 20, 22 may be segmented such that different portions achieve different potentials. This may, for instance, help to achieve uniform electroadhesive strength regardless of the location of the finger on the touch surface.

In a preferred embodiment, the Hx (and Tx) electrodes are 5 mm in width and run the length of the touch surface, although electrodes as narrow as 0.1 mm or as wide as 20 mm in width may be used; the deletion line width between Hx electrodes 20 is 200 microns, although widths as narrow as 10 microns or as wide as 1 mm may be used; and the deletion line width between Tx electrodes 12 is 60 microns, although widths as narrow as 10 microns or as wide as 1 mm may be used. The glass thickness is preferably 0.4 mm although thicknesses from 0.025 mm to 3 mm may be used; and the glass dielectric constant is 6 to 7, although dielectric constants from 3 to 80 may be used. Indeed, the substrate may not be glass at all, but may be another dielectric material, such as plastic, sapphire, or ceramic.

Bipolar Haptics and the Potential of the Body

Figure 4:
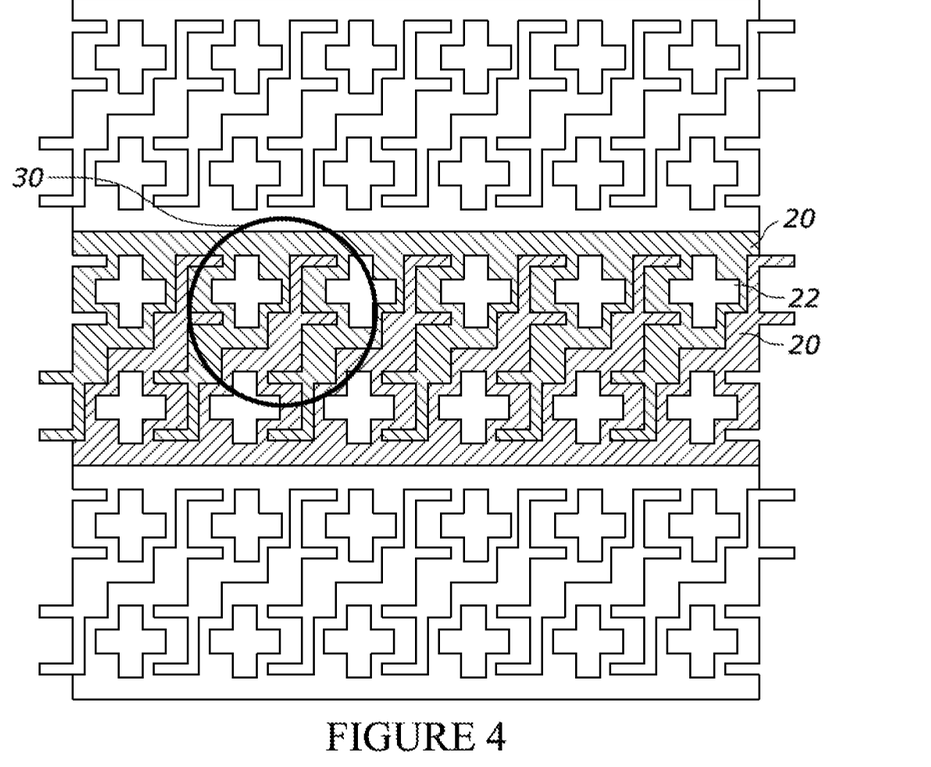
FIG. 4 is another exemplary arrangement of a touch panel in which Hx electrode pairs are more deeply invaginated into one another.

In general, the potential of the body may not be at earth ground, meaning C_body is not discharged. External factors, such as triboelectrification, may affect the body's potential, but for the purposes of simplification, these factors are ignored here. Of greater importance is the fact that the Hx electrodes 20 themselves may affect the body's potential relative to the device ground. Because the insulator covering the Hx electrodes 20 is typically quite thin, the finger (or other body part) 28 touching the surface may be strongly coupled to those electrodes. If a finger 28 were to be strongly coupled to only a single Hx electrode 20, then the body's potential would tend to follow that of the Hx electrode 20. In the situation where the body's potential is weakly coupled to earth ground, and thus device ground, this would lead to a small potential difference between the body and the Hx electrode 20, leading to a weak haptic effect. In the condition where the device ground is separated from earth ground entirely, this would leave no potential difference between the body and the Hx electrode 20, leading to virtually no haptic effect at all. For these reasons (and others involving sensing), the Hx electrodes 20 are preferably operated in the bipolar manner described here. Moreover, the Hx electrodes 20 may be configured such that a finger 28 will always touch more than one. There are various electrode geometries that will achieve this goal. FIG. 1A shows a preferred embodiment, in which the Hx electrodes 20 are strips, but sufficiently thin such that the finger 28 will always touch more than one. FIG. 4 shows another exemplary arrangement in which Hx electrode 20 pairs are more deeply invaginated into one another, to an even greater extent ensuring that the finger will cover one of each polarity. Shown are three rows of deeply invaginated bipolar electrodes. The white "plusses" are Island electrodes 22 and the Hx (and Tx, which are not shown, but which would be "mirrored") electrodes 20 are arranged in pairs. In this image, the Tx electrode 12 underneath the light grey electrode (not shown) is activated with one polarity, and the Tx electrode 12 underneath the dark grey electrode (not shown) is activated with the opposite polarity. The Tx electrodes 12 underneath the other Hx electrodes 20 are held at device ground potential. The invagination of the electrodes is intended to ensure that a finger 28 placed anywhere on an Hx pair 20 is likely to cover approximately the same area of each polarity, thus keeping the body potential close to the average of the two polarities. This is illustrated by the circle 30 in the image, which represents a fingertip contact having an 8 mm diameter (the Is electrodes 22 are laid out on a 5 mm grid in this embodiment). As can be seen, the amount of each polarity (light grey and dark grey) underneath the fingertip 28 is roughly equal, and this will be true for most finger locations.

Figure 5:
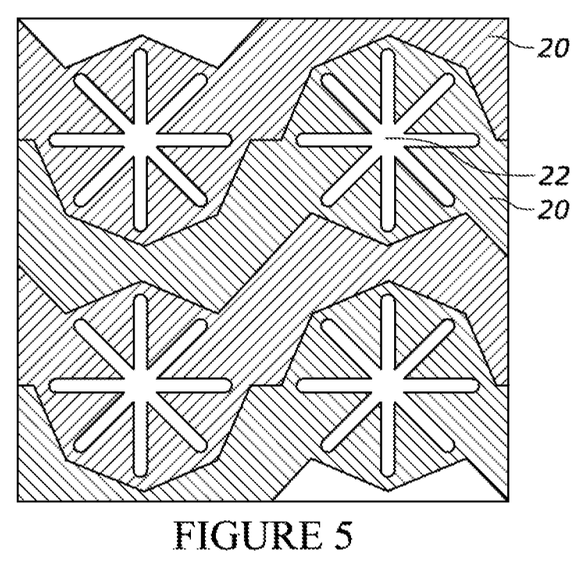
FIG. 5 is yet another exemplary approach to the invagination of Hx and Tx electrodes, which involves thinner electrodes.

FIG. 5 shows a different exemplary approach to the invagination of Hx and Tx electrodes 20, 12, which involves thinner electrodes. In this embodiment, the Hx and Tx electrodes 20, 12 are on a 2.5 mm pitch even as the island electrodes 22 are on the same 5 mm pitch shown in FIG. 1 and FIG. 4. Although it requires twice as many Tx lines 12, this design has another advantage, in addition to ensuring that the finger 28 is in contact with roughly equal parts of both polarities. The second advantage is that each Rx (not shown, but running vertical in the figure) electrode 14 is responsive to only one polarity. Thus, instead of leading to differential signals (as discussed below), this scheme leads to signals that each vary in a single direction relative to ground. Alternatively, the two neighboring Rx lines 14 could be connected together and the balanced sensing methods discussed in this disclosure could be applied.

With invaginated geometries such as these (and many variations, which should now be obvious to those skilled in the art) and bipolar operation, the body potential is assured to be in-between that of the two Hx electrodes 20, close to device ground. In essence, the body is actively held near virtual device ground by the two opposite polarity Hx electrodes 20. The term virtual ground is used here not to denote that the body is used as a low impedance sink or source, but rather that is it simply unaffected, on average, by the two Hx electrodes 20. To put it another way, operating the Hx electrodes 20 as a bipolar pair serves to cancel out, or balance, their overall effect on the body potential relative to the device and device ground.

Bipolar Sensing

Sensing is performed by measuring the signal transmitted from Tx lines to Rx lines 12, 14. For the purposes of exposition, consider the case in which a voltage is applied to a single Tx line 12 and a measurement is made at a single Rx line 14. In a preferred embodiment, the same voltage rails that are used for haptics are also used for this purpose, although other voltages may also be used. The measurement is partially due to the mutual capacitance C_TR between the Tx and Rx electrodes 12, 14, but in the present invention, C_TR is not affected by the presence of a finger. As such, the present invention is not based on the well-known technique of mutual capacitance. Instead, it may work as follows: when a voltage is applied to a Tx line 12, it causes the potential of the mirrored Hx line 20 to vary in the manner that has already been discussed. The Is electrodes 22 that lie within that Hx electrode 20 will also achieve potentials close to that of the Hx electrode 20 due to their coupling with both the Hx electrode 20 and the underlying Tx electrode 12. Each Is electrode 22 will also influence that of the underlying Rx 14 electrode due to the capacitive coupling C_RI. If a finger is placed partially or fully over a given Is electrode 22 (for instance, Is_n×m), the potential of the Is electrode 22 will be influenced and this, in turn, will influence the measurement associated with Tx_n, Rx_m. In other words, it is the finger's effect on the Is electrodes 22 that creates signal.

In the present invention, signaling on the panel may be controlled via the control device connected to the position sensor and the friction modulator by pulsing the Tx electrodes 12 in a bipolar manner. This means that at each measurement, there is one or more Tx electrode 12 pulsed in a positive direction, and an equal number of Tx electrodes 12 pulsed simultaneously in a negative direction. In a preferred embodiment, the positive and negative Tx electrodes 12 are adjacent (if Tx_n is positive-going, then Tx_n−1 is negative going), and the sensing pulses are cycled through Tx electrodes 12 sequentially, with a measurement on the Rx lines 14 made for each pulse.

The effect of bipolar pulses on the measurements depends on the layout of the touch panel. Consider, for example, the panel design shown in FIG. 1. Due to the bipolar nature of the signal, the influences from Is_n×m and Is_n+1×m will cancel or balance out. When there is no fingertip touching the panel, the capacitive loads are balanced, and little to no signal is measured on any Rx line 14. When a fingertip comes into contact with the panel, the Is electrode 22 that is underneath the fingertip experiences heavier loading, and the unbalanced loading results in a signal on the Rx line 14 underneath the touched Is electrode 22.

Consider a fingertip that is centered directly over island electrode 22 Is_n×m, and a sensing signal that consists of a positive pulse on Tx_n 12 and a negative pulse on Tx_n−1 12. Due to the very thin insulating layer, the finger has strong capacitive coupling to the Is_n×m electrode 22 and will exert a substantial influence on its potential. As discussed earlier, bipolar actuation will keep the finger close to device ground; thus, the finger will tend to pull the Is electrodes 22 toward virtual device ground. In this case, since Is_n×m is directly over the positively pulsed Tx_n electrode 12, the loading will be unbalanced in favor of the negative-going Tx_n−1 12 pulse, and the Rx_m electrode 14 will receive a negative signal. On the next sequenced cycle, Tx_n 12 is a negatively pulsed electrode, and the Rx_m electrode 14 will receive a positive signal due to the unbalanced loading.

If we now consider a fingertip that equally loads two adjacent Is electrodes 22 (Is_n−1×m and Is_n×m), the expected output signal on Rx_m 14 is different. In this case, the Rx_m electrode 14 will receive zero signal when the Tx_n−1 and Tx_n pair 12 is activated, yet it will receive signal when the Tx_n−2 and Tx_n−1 pair 12 is activated and also when the Tx_n and Tx_n+1 pair 12 is activated.

A fingertip that is in between the two aforementioned cases will exhibit a combination of these two signal types, and the position can be inferred thereby detecting the position of the fingertip through an interpolation between the two loading conditions—a position sensor configured to detect one or more touch locations of a user's appendage on the touch surface.

Figure 6:
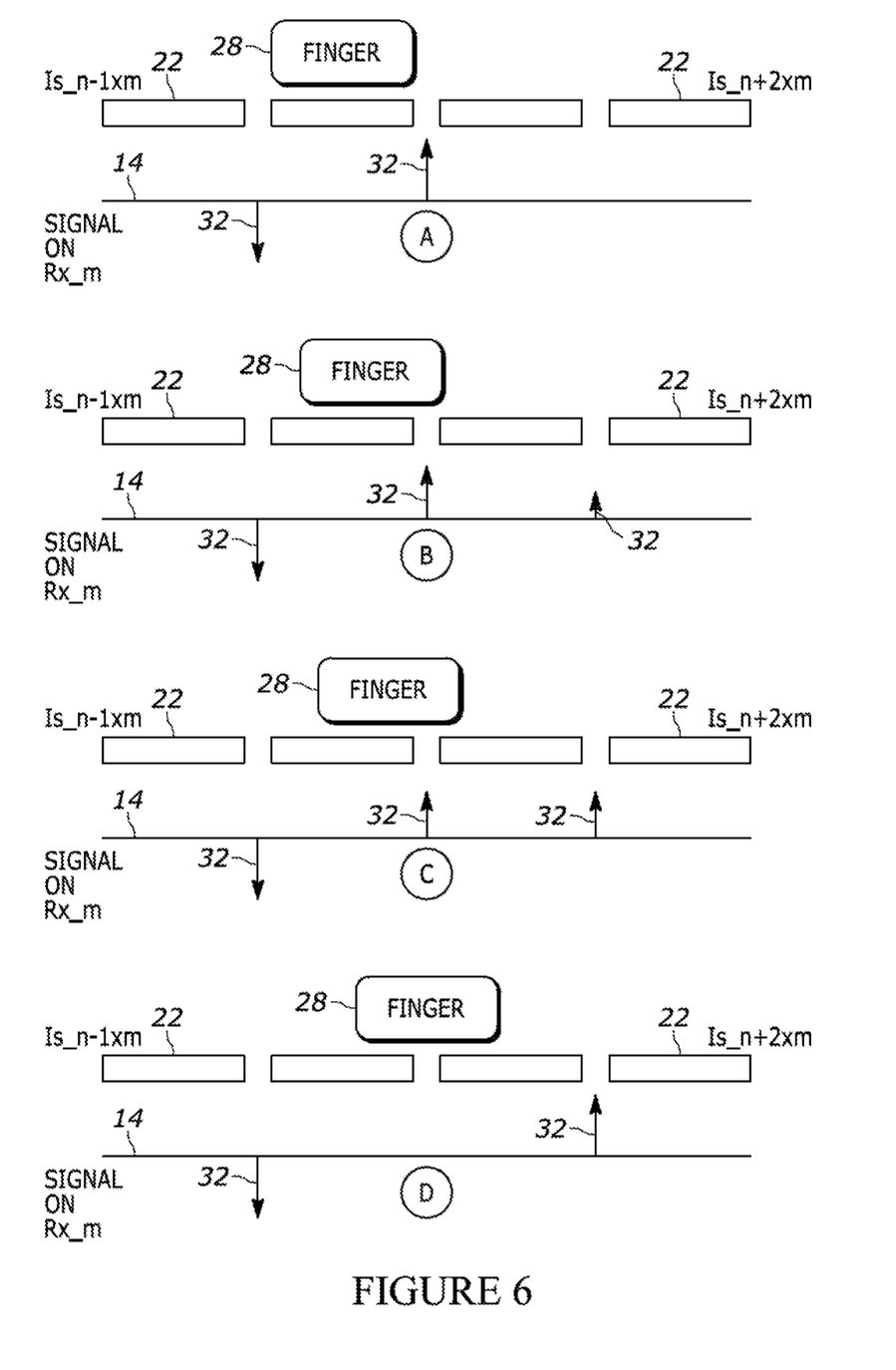
FIG. 6 is an illustration of the effects of finger placement at various points above and near electrodes on a touch panel.

FIG. 6 shows examples of how the resulting signal may change as a fingertip 28 slides from one Is electrode 22 to another along the direction of the Rx electrodes 14. In the figure, an array of four electrodes is shown, from Is_n−1×m to Is_n+2×m 22. Centered beneath each pair of electrodes is an arrow 32 representing the expected signal measured on Rx_m 14, given that the Tx electrode (not shown) above it and to the left is pulsed negatively and the Tx electrode (not shown) above it and to the right is pulsed positively. In the first example shown in FIG. 6 (referenced by a circled "A"), the fingertip 28 (shown as a rounded rectangle) is centered above electrode Is_n×m 22, heavily loading that electrode. When Is_n−1×m 22 is pulsed negatively and Is_n×m 22 is pulsed positively, the resulting Rx_m 14 signal is strongly negative. When, in a next step, Is_n×m 22 is pulsed negatively and Is_n+1×m 22 is pulsed positively, the resulting Rx_m 14 signal is strongly positive. When, in a next step, Is_n+1×m 22 is pulsed negatively and Is_n+2×m 22 is pulsed positively, the resulting Rx_m 14 signal remains at zero. These signals are illustrated by the downward (negative) and upward (positive) arrows in the figure.

The second through fourth examples shown in FIG. 6 (referenced by circled "A," "B," and "C") show roughly how the signal will result given different fingertip positions. It is plainly seen in this illustration that the choice for which electrode is driven negative and which is driven positive has a substantial effect on the signal. As such, it is possible to choose different bipolar arrangements in order to gain more information about the fingertips or other body parts (e.g., palm of the hand) touching the panel without deviating from the spirit of the invention, which is to use bipolar pulses for sensing as well as haptics. For instance, it may be desirable in some circumstances to space the positive-going and negative-going electrodes one electrode apart instead of adjacent to one another. This may accentuate signals in certain situations. It should be understood that alternative selections for the signaling sequence are also part of this invention.

Alternative Panel Layouts

As mentioned earlier, the effect of bipolar pulsing does depend on the layout of the panel. Instead of the layout of FIG. 1, the alternative layout shown in FIG. 7 may be used. The key difference is that, whereas in FIG. 1 every Tx 12 coupled to every Rx 14, in FIG. 7 every second Tx 12 couples to every second Rx 14. As such, when a pair of bipolar pulses are delivered to two neighboring Tx lines 12 (e.g., the two shaded lines on the bottom side), the positive-going pulse couples principally to half of the Rx lines 14 while the negative-going pulse couples principally to the other half of the Rx lines 14. It should be noted that the island electrodes 22 are now in a diamond rather than square grid, although other arrangements may be used. In order to maintain the same or similar center-to-center distance between island electrodes 22 as seen in FIG. 1, the pitch of both the Tx and the Rx electrodes 12, 14 may be reduced by a factor of about the square root of two. As such, this panel may have approximately 41% more Tx, Rx and Hx electrodes 12, 14, 20. However, this is just one example of a layout and it will be obvious to one skilled in the art that many other panel layouts are possible within the spirit of the invention. As one further example, it is possible to use an arrangement of Tx electrodes 12 like the ones shown in FIG. 1B, but twice as many Rx electrodes 14. Each Rx electrode 14 may be configured to couple to every second Tx electrode 12. In this way, each Rx electrode 14 would couple to only a single polarity, not to both.

Instead of making independent measurements on each Rx line 14, it is also possible to make differential measurements. For instance, instead of separate measurements for Rx_i and Rx_i+2, it is possible to measure Rx_i+2-Rx_i. This has two advantages: it reduces the number of channels that need to be read, and it removes common mode noise.

Figure 7:
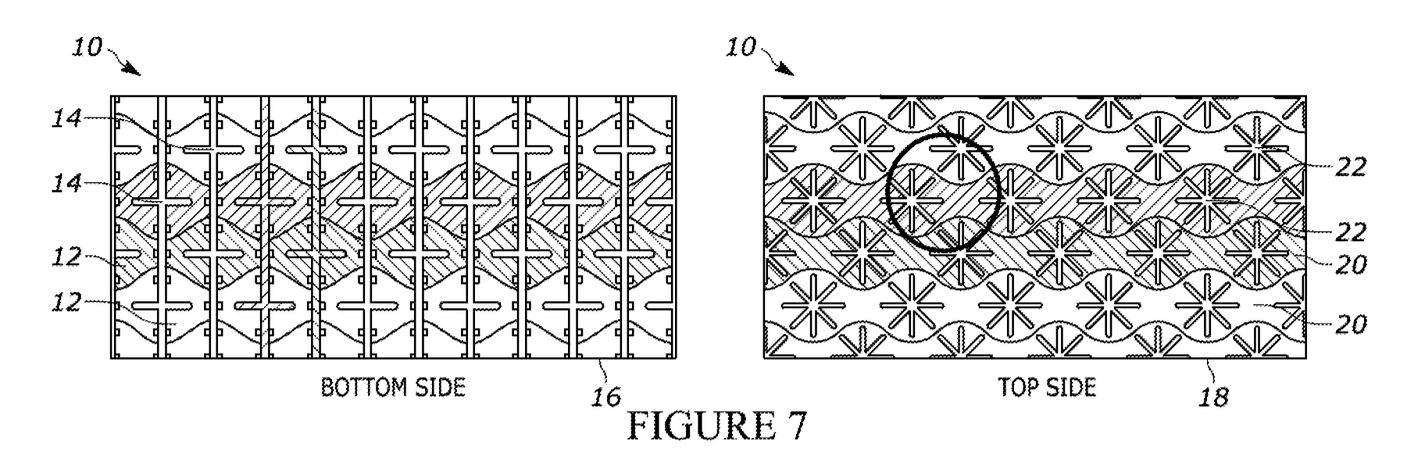
FIG. 7 is another exemplary layout of a touch panel in accordance with the present disclosure.
Figure 8:
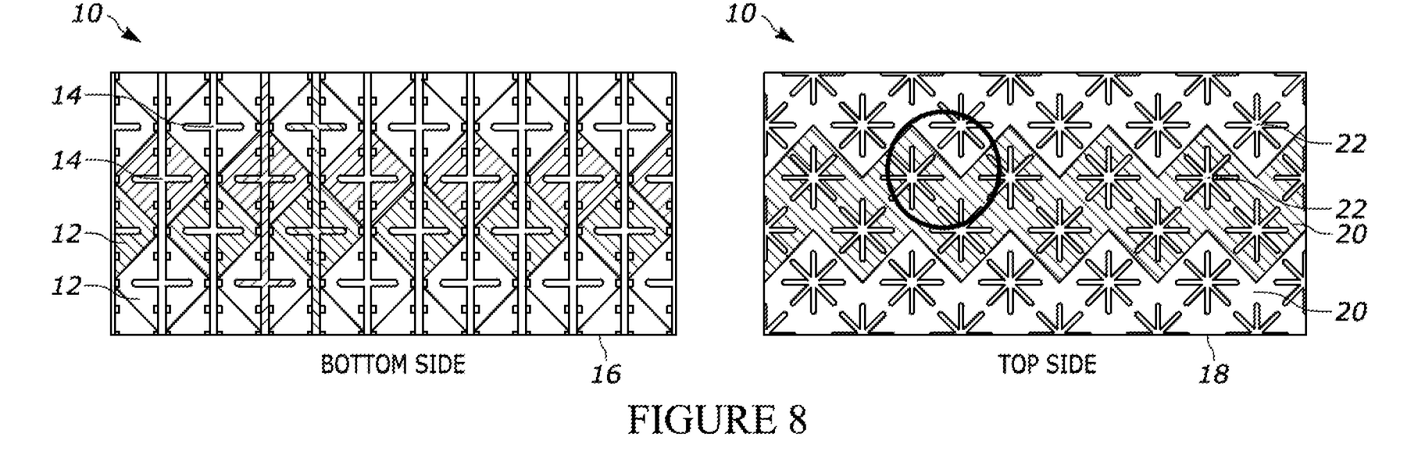
FIG. 8 is yet another exemplary layout of a touch panel in accordance with the present disclosure.

While the layout of FIG. 7 maintained a "mirrored" relationship between the Tx and Hx electrodes 12, 20, this is not necessary. For instance, as shown in FIG. 8, each Hx electrode 20 can actually span two Tx electrodes 12. With this panel design, sensing may work much the same as in FIG. 6: bipolar pulses are applied to two neighboring Tx electrodes 12 which share a common Hx electrode 20. While the Hx electrode 20 remains approximately at ground potential, the island electrodes 22 still float in the direction of the underlying Tx electrode 12 due to the capacitive coupling C_TI. A finger 28 placed over an island 22 pulls that island 22 back toward ground, especially since the finger 28 is strongly coupled to the at-ground Hx electrode 20. As an alternative, Is electrodes 22 may be eliminated altogether and replaced by openings (e.g., circular holes, asterisk shapes, or even slits) (not shown) in the Hx electrodes 20. In this design, some of the field lines beginning at a Tx electrode 12 would project above the touch surface before coupling back to an Rx electrode 14. A finger placed above the opening would serve to distract those field lines, producing a measurable change in the signal received at the Rx electrode 14. In order to create haptics, four Tx electrodes 12 are used, although other numbers of Tx electrodes 12 may be used. The two Tx electrodes 12 under a given Hx 20 are run in the same polarity, while the two Tx electrodes 12 under a neighboring Hx 14 are run in the opposite polarity.

Although the preferred embodiment involves Tx and Hx electrodes 12, 14 that are shaped like long strips running from one side of the touch panel 10 to another, this need not be the case. The invention is able to accommodate a great variety of electrode shapes, so long as they may be operated in a bipolar manner. For instance, it may be desirable to use electrodes that are serpentine in shape and that occupy dense regions of the panel rather than extending from one side to another. This would be useful, for instance, in localizing the haptic regions.

Additional Benefits of Bipolar Sensing and Actuation

The use of bipolar sensing and haptic signaling also has a dramatic impact on the radiated emissions by the device to the outside world. This is very desirable in cases where this radiated emission might impact the fidelity or reliability of nearby circuits or radio receivers. The electromagnetic emission capability of a given electrical conductor is dominated by the length and geometry of the conductor, as well as the amount of current or voltage presently applied to that conductor. In the case of the present invention, and the preferred embodiment, neighboring lines share a near identical geometry and electrical transient response. This is the reason why bipolar signaling on the panel reduces radiated emissions. It is because the Tx and Hx line pairs 12, 14 are driven in opposite polarity and similar strength meaning their emissions essentially balance each other out. This is especially true in the electrical far field, but the effect is still pronounced and impactful near the panel and electrodes themselves. To achieve this balancing, it is helpful to balance as many aspects of the positive and negative signals as possible. For instance, the positive and negative power rails may be matched, and the slew rates for turning signals on and off may be matched. Additionally, the total resistance and capacitance of each Tx line 12 may be matched to that of each other Tx line 12, and similarly the total resistance and capacitance of each Rx line 14 may be matched to that of each other Rx line 14.

Another advantage of bipolar signaling is the additional safety it grants to users with respect to unintentional touch current, sometimes called device leakage current. This current is defined as the unintentional current that flows between a device and a user back to earth ground under normal tactile contact with the device. International safety standards dictate waveform limits (both amplitude and frequency) of this touch current in various types of products, such as medical devices, consumer devices, etc., and it is by adhering to these standards that most products on the market are considered safe to use. Bipolar sensing and haptic signaling reduces the unintentional electroadhesive touch current to very low levels. This is, once again, due to the balancing nature of the signals, and the fact that the device tends to leave the body potential near virtual device ground. This means there is no current path for touch current to take through the body back to local earth ground. Essentially, this means that any positive current applied into the body by the device is simultaneously balanced out by a corresponding negative current, also applied by the device at the point of contact. This limits the overall magnitude of current traveling in the body, and the possible current paths it can take.

Another advantage of bipolar actuation is that high voltage bipolar actuation signals can be arranged such that they might cancel out entirely with bipolar sensing signals. Just as the bipolar actuation signals can be geometrically configured to balance out the effect they have on the body, thus holding the body at virtual ground, they can also be geometrically configured to balance out their effect on Tx and Rx electrodes 12, 14 within the invention's sensing circuit. In this way, the higher voltage haptic actuation circuits would have no interaction with the lower voltage sensing circuits. The actuation circuits would leave the sensing circuits unaffected. This might allow a smaller number of high voltage circuits to be used for actuation, while a larger number of low voltage circuits can be used for sensing. This can lead to reduced cost, complexity, and power consumption, among other advantages. In this embodiment Rx electrodes 14 could be similarly configured as in FIG. 1B, while backside Hx electrodes 20 might replace the Tx electrodes 12. These backside Hx 20 could interact with the topside Hx electrodes 20 in FIG. 1A in the same manner as the original Tx electrodes 12. Additional low voltage Tx electrodes 12 might then be placed directly in between backside Hx electrodes 20, and the sensing node and Is electrodes could be relocated to the new intersection 26 of Tx and Rx 12, 14, which is between Hx electrodes 20.

Self-Capacitance Sensing

The techniques described above for the control of both electroadhesive haptics (the friction modulator) and sensing the state of discrete Tx-Rx intersections 26 (the position sensor) in other words using a control device connected to the position sensor and the friction modulator may be combined with self-capacitive sensing. Ordinarily, self-capacitance is used as a means of measuring the state of individual electrodes (e.g., Tx electrodes 12) as opposed to electrode intersections 26. In a typical implementation, voltage is placed on an electrode, while the current is measured and integrated to estimate the associated charge. Capacitance is estimated as the ratio of the charge to the applied voltage, and will depend on the presence of nearby conductive objects, such as a human finger. Self-capacitance is known to be problematic for multi-touch sensing, but is a fast and efficient way to gather some information about the state of touch. It is also quite useful in disambiguating objects, like the human body, that are large and well-coupled to earth ground from objects, like water droplets, that are small and poorly coupled. Often, self-capacitance is used in conjunction with mutual capacitance measurements.

In the present invention, bipolar self-capacitance measurements may supplement or even replace the bipolar measurements that have been described so far. Signaling would be similar to what has been described, but the measurement would be of integrated current on the Tx electrodes 12 rather than signal received on the Rx electrodes 14. The same set of electrodes can be used for both self-capacitance and mutual capacitance measurements, or alternatively, different electrodes may be used for each function. For instance, self-capacitance and mutual capacitance electrodes may be alternated. Instead of measuring the integrated current on a Tx electrode 12, self-capacitance can be estimated by summing the signals across all of the Rx electrodes 14 when signal is sent to a particular Tx electrode 12.

Guard Electrode

In a preferred embodiment, electrical signals are introduced on the bottom side 16 of the substrate 10, while the electrodes on the top side (Hx 20, Is 22) are capacitively coupled. Typically, the electrical signals are introduced via a flex cable, although other types of connectors may be used. In order to distribute bottom side signals from the point where the flex cable is attached to the Tx and Rx electrodes 12, 14, conductive traces may be used. These traces are themselves a source of radiated emissions. To limit emissions, a guard electrode 38 (illustrated in FIGS. 9A and 9B) may be placed around the perimeter of the top side and this guard electrode 38 may be capacitively coupled to a ground electrode on the bottom side 16. The ground electrode 38 can be large, occupying most of the bottom side 16 perimeter except the area occupied by conductive traces.

Figure 9A:
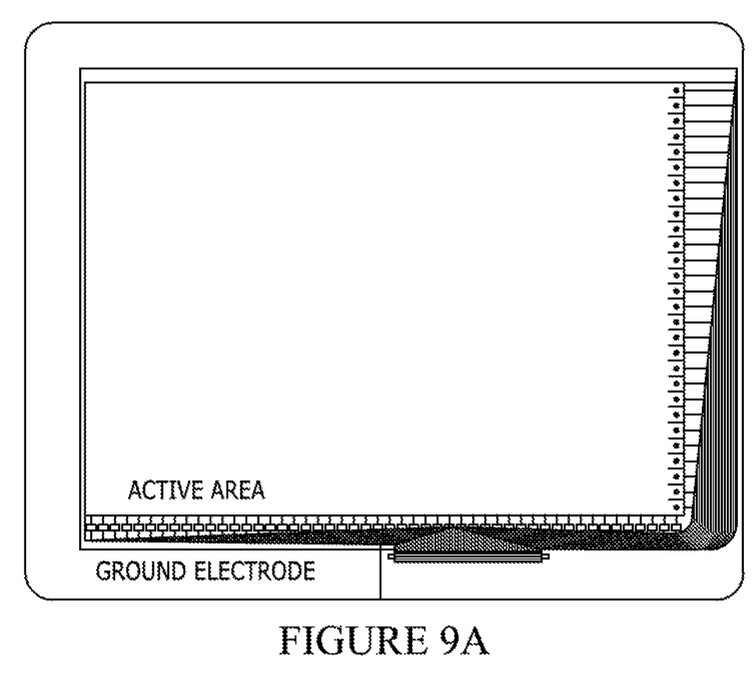
FIG. 9A is an illustration of a touch panel with a guard electrode in accordance with one embodiment of the present disclosure.
Figure 9B:
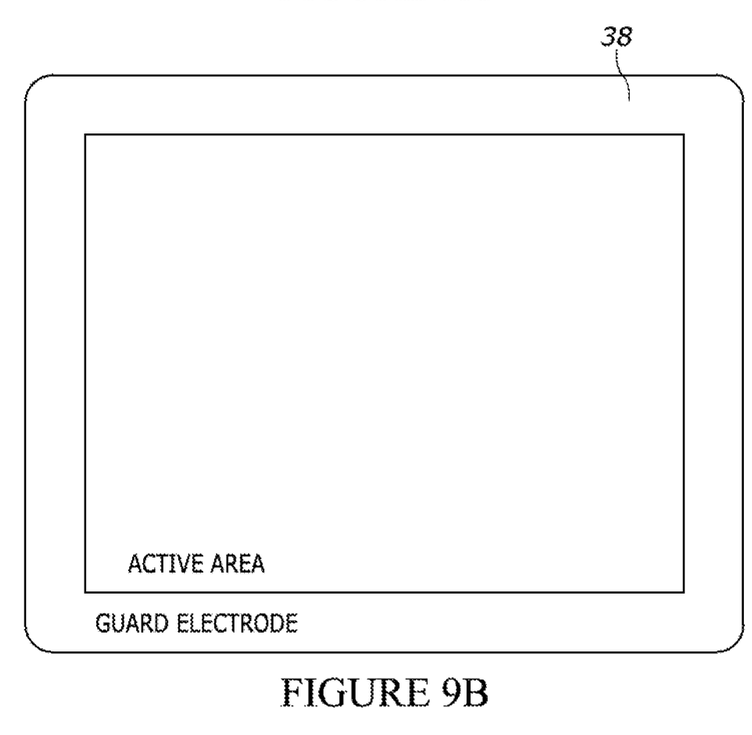
FIG. 9B is also an illustration of a touch panel with a guard electrode in accordance with one embodiment of the present disclosure.

An added advantage of the top side guard electrode 38 is that it maintains the same overall optical stackup as is found elsewhere on the panel. In other words, except for the deletion lines that define the Hx and Is electrodes 20, 22, the top side conductive layer 18 is uniform.

Panel Construction

Figure 10:
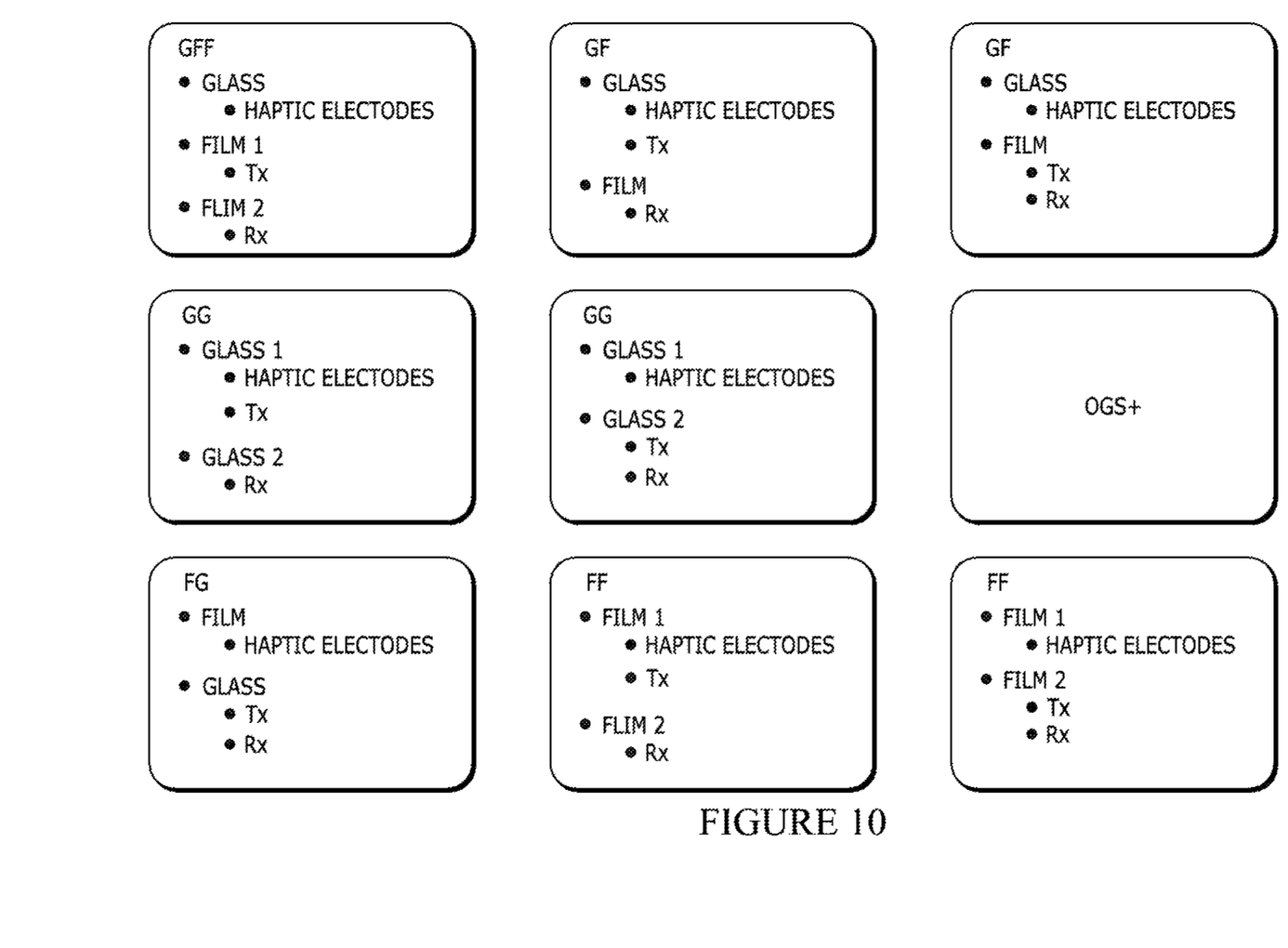
FIG. 10 is an illustration of exemplary constructions of touch panel layers.

There are many possible ways to manufacture a haptic touch panel having the electrode arrangements and insulating layers contemplated in this invention. The invention relies on four main components: patterned conductive layer 1 for Rx electrodes 14, patterned conductive layer 2 for Tx electrodes 12, patterned conductive layer 3 for Hx and Is 20, 22 electrodes and a protective dielectric over the Hx and Is electrodes 20, 22. These layers along with other layers such as index matching layers, buffer layers, anti-reflective layers, oleophobic layers, etc. can be on one or more substrates depending on the application and customers' needs as shown in FIG. 10 which is not inclusive of all possible constructions. For instance, one possible construction involves a top layer which is oleophilic instead of oleophobic. While an oleophobic coating may limit the transfer of body oils to the touch surface, an oleophilic coating may promote the transfer of these oils, but also the even spreading of the oils across the surface.

In a preferred embodiment, the substrate 10 is glass and is etched on the top (touch) surface. The use of an etched or textured substrate may result in increased haptic strength while keeping the applied voltage, contact area, and dielectric layers thicknesses the same. As an alternative to the use of a textured substrate, a texture may be applied on top of the substrate. For instance, nanoparticles may be added to the insulating layer above the Hx and Is electrodes 20, 22 or the insulating layer could be itself precisely textured using for example plasma etching. An additional benefit of a textured touch surface is that it may ensure haptic uniformity across all environmental conditions including high and low temperature and high and low humidity.

As mentioned earlier, FIG. 10 does not cover all possible constructions and ways to build the device. For example, rigid or flexible plastic or any other type of substrate whether transparent, translucent, or opaque can be used instead of or in combination with either the glass or film substrate. Anti-spalling which is important for head impact in the case of automotive applications or safety concerns in other markets can be achieved by optically bonding the substrate of the device or the device itself to a display or bonding it to a mounting surface. In the case where the top (touch surface) is either a film (flexible) or rigid plastic substrate, an automotive head impact specification is easily achieved.

Figure 11:
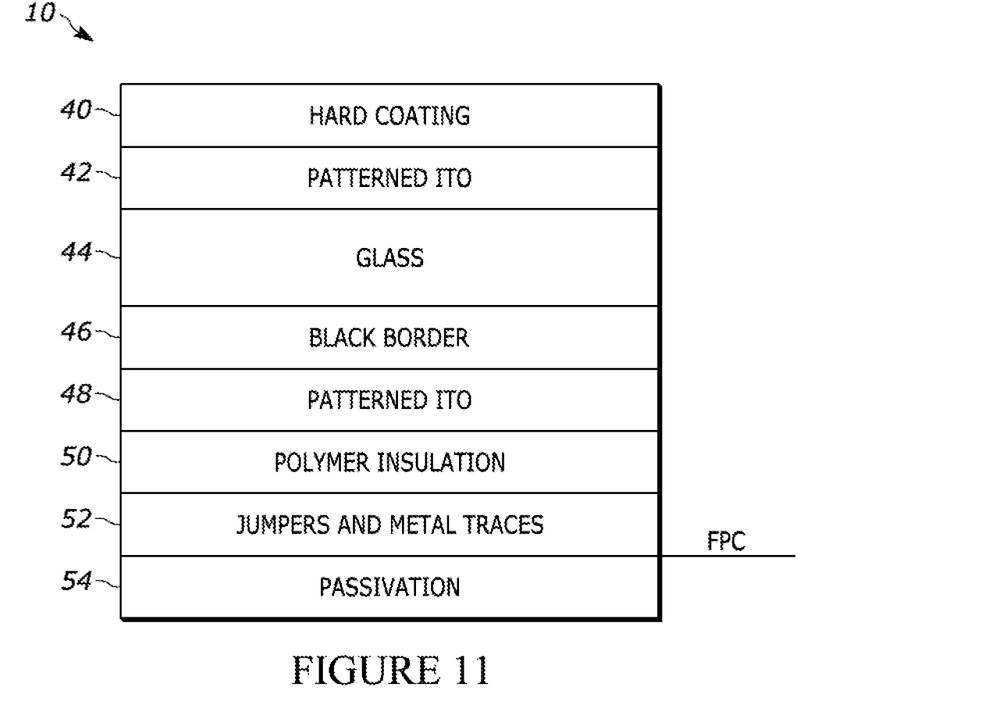
FIG. 11 is an illustration of one exemplary construction of a touch panel.

A preferred embodiment described here is referred to as OGS+(One Glass Solution+) construction and is shown in FIG. 11. However, the substrate 10 need not be glass—it may also be any insulating or semiconducting material such as plastic, leather, wood, cloth, etc. with the haptic electrodes 20 on the touch surface and the Rx and Tx electrodes 12, 14 on the opposite surface. FIG. 11 shows just one possible OGS+ stackup (i.e., set of layers) on a glass substrate. A dielectric hard coating layer 40 is the top layer and is followed by a patterned ITO layer 42 that includes the Hx and Is electrodes 20, 22. The next layer is a glass layer 44 and then a black border 46. Next follows a second patterned ITO layer 48 that includes the Tx and Rx electrodes 12, 14. Following that layer is a polymer insulation layer 50, jumpers and metal traces 52, and then a passivation layer 54.

Figure 12:
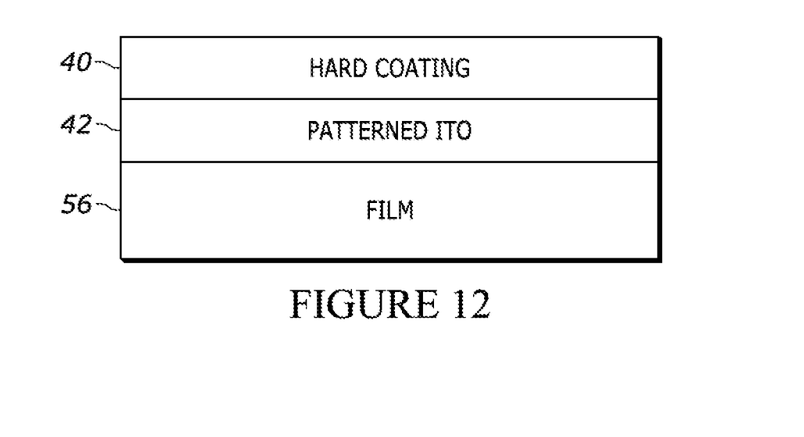
FIG. 12 is an illustration of another exemplary construction of a touch panel.

For flexible devices, 3D or 2.5D shapes, or applications where anti spalling is needed, the top side may be made up of a film. The film may be PET, PEN, PC, COC, COP, PMMA, etc. and will have a conductive layer 42 and a dielectric hard coating 40 (FIG. 12). Again other coatings such as anti-fingerprint and AR layers may be added. The bottom side electrodes may be placed on glass or may also be placed on film 56, leading to a film-film construction.

It is understood that the above construction can also be applied to other materials such as cloth, leather, thin glass (=<0.2 mm thick), etc. Also, the haptic film/Tanvas sensor can be used in insert mold manufacturing or other similar processes to produce devices having complex three-dimensional shapes.

Although certain illustrative embodiments of the invention are described hereabove, those skilled in the art will appreciate that changes and modifications can be made thereto without departing from the spirit and scope of the invention as set forth in the appended claims.

What is claimed:

1. An indirect haptic device, comprising:
    a substrate having a touch surface comprising a top surface and a bottom surface;
    a plurality of haptic electrodes and a plurality of island electrodes arranged on the top surface of the substrate;
    a plurality of transmit electrodes and a plurality of receive electrodes arranged on the bottom surface of the substrate;
    a position sensor configured to detect one or more touch locations of a user's appendage on the touch surface;
    a friction modulator associated with the substrate and configured to modulate the friction between the user's appendage and the touch surface; and
    a control device connected to the position sensor and the friction modulator, wherein the control device is configured to apply bipolar electrical signals to the plurality of transmit electrodes to both detect one or more touch locations of a user's appendage on the touch surface and to modulate the friction between the user's appendage and the touch surface;
    wherein each of the plurality of haptic electrodes are substantially aligned with and capacitively coupled to a corresponding two of the plurality of transmit electrodes; and
    wherein the plurality of haptic electrodes are arranged such that each of the plurality of haptic electrodes is at least partially invaginated into another of the plurality of haptic electrodes.

2. The indirect haptic device of claim 1, wherein:
    the plurality of transmit electrodes comprise a first pair of transmit electrodes corresponding to and substantially aligned with a first of the plurality of haptic electrodes and a second pair of transmit electrodes corresponding to and substantially aligned with a second of the plurality of haptic electrodes, wherein the device is configured to apply a positive voltage signal to the first pair of transmit electrodes and a negative voltage signal to the second pair transmit electrodes to produce a haptic response.

3. The indirect haptic device of claim 1, wherein:
    the control device is configured to apply a positive voltage signal to a first of the plurality of transmit electrodes and a negative voltage signal to a second of the plurality of transmit electrodes, wherein the first and second transmit electrodes is substantially aligned with a first haptic electrode, wherein the combined signal applied to the first haptic electrode by the positive and negative voltage signals is substantially near a ground potential voltage to enable sensing.

4. The indirect haptic device of claim 1, wherein:
    the plurality of island electrodes do not have any ohmic or direct connection to other conductive elements of the indirect haptic device.

5. The indirect haptic device of claim 1, wherein:
    the plurality of haptic electrodes extend laterally across the top surface of the substrate in a first direction and the plurality of transmit electrodes extend laterally across the bottom surface of the substrate in the first direction, wherein the plurality of receive electrodes extend laterally across the bottom surface of the substrate in a second direction that is substantially perpendicular to the first direction such that the plurality of transmit electrodes and plurality of receive electrodes form a plurality of intersections; and
    each of the plurality of island electrodes is aligned on the top surface with one of the plurality of intersections to form a capacitive coupling between the one of the plurality of intersections and the corresponding island electrode on the top surface.

6. The indirect haptic device of claim 1, wherein:
    the plurality of haptic electrodes comprise a first group having a positive polarity and a second group having a negative polarity, wherein the potential voltage of the user when the user's appendage contacts the touch surface is affected by both the positive polarity of at least one of the first group of haptic electrodes and the negative polarity of at least one of the second group of haptic electrodes.

7. The indirect haptic device of claim 6, wherein:
    the potential voltage of the user affects the potential voltage of at least one of the plurality of island electrodes when the user's appendage contacts the touch surface.

8. The indirect haptic device of claim 6, wherein:
    a potential voltage of the haptic electrode affects the potential voltage of the user when the user's appendage contacts the touch surface, wherein the potential voltage of the user affects the potential voltage of each of the plurality of island electrodes contacted by the user's appendage.

9. The indirect haptic device of claim 1, wherein:
    the plurality of haptic electrodes and the plurality of island electrodes do not have any ohmic or direct connection to other conductive elements of the indirect haptic device.

10. The indirect haptic device of claim 1, wherein:
    the control device is configured to apply a positive pulse to a first group of the transmit electrodes and a negative pulse to a second group of the transmit electrodes, wherein the number of electrodes in the first group and the second group are the same.

11. The indirect haptic device of claim 1, wherein:
    one or both of the top and bottom surfaces of the substrate are etched.

12. The indirect haptic device of claim 1, wherein:
    the bipolar electrical signal comprises at least one positive signal and at least one negative signal, wherein the control device is further configured to balance the application of a magnitude of the at least one negative signal and a magnitude of the at least one positive signal, such that an absolute magnitude of the signals applied by the control device is substantially near a ground voltage.

* * * * *